(12) United States Patent
Nagaya et al.

(10) Patent No.: US 9,031,759 B2
(45) Date of Patent: May 12, 2015

(54) VEHICLE BEHAVIOR CONTROL DEVICE

(75) Inventors: Junya Nagaya, Kariya (JP); Toshihisa Kato, Handa (JP)

(73) Assignee: Advics Co., Ltd., Kariya, Aichi-Pref. (JP)

( * ) Notice: Subject to any disclaimer, the term of this patent is extended or adjusted under 35 U.S.C. 154(b) by 655 days.

(21) Appl. No.: 13/395,274

(22) PCT Filed: Sep. 9, 2010

(86) PCT No.: PCT/JP2010/065484
§ 371 (c)(1),
(2), (4) Date: Mar. 9, 2012

(87) PCT Pub. No.: WO2011/033982
PCT Pub. Date: Mar. 24, 2011

(65) Prior Publication Data
US 2012/0173111 A1   Jul. 5, 2012

(30) Foreign Application Priority Data
Sep. 18, 2009   (JP) .................................. 2009-217365

(51) Int. Cl.
*B60K 28/16*   (2006.01)
*B60T 8/1755*   (2006.01)

(52) U.S. Cl.
CPC ............... *B60T 8/1755* (2013.01); *B60K 28/16* (2013.01)

(58) Field of Classification Search
USPC .......................................................... 701/72
See application file for complete search history.

(56) References Cited

U.S. PATENT DOCUMENTS 5,328,255 A * 7/1994 Isella ........................... 303/140
5,640,324 A   6/1997 Inagaki
(Continued)

FOREIGN PATENT DOCUMENTS

DE   3939069 A   *   5/1991  .............. B60T 8/175
DE   199 58 492 A1   12/1999
(Continued)

OTHER PUBLICATIONS

International Search Report (PCT/ISA/210) issued on Oct. 5, 2010, by Japanese Patent Office as the International Searching Authority for International Application No. PCT/JP2010/065484.
Written Opinion (PCT/ISA/237) issued on Oct. 5, 2010, by Japanese Patent Office as the International Searching Authority for International Application No. PCT/JP2010/065484.
(Continued)

*Primary Examiner* — Shelly Chen
(74) *Attorney, Agent, or Firm* — Buchanan Ingersoll & Rooney PC

(57) ABSTRACT

To improve vehicle stability by starting control based on quicker detection of the possibility that a vehicle state will reach an unstable region. It is detected that a vehicle is in a pre-skid state that is the state prior to when the vehicle reaches an unstable region where skid occurs, and brake force is generated in a rear wheel at an outside of a turn when the pre-skid state is detected. As a result of generating this brake force, load applied to the wheels at the outside of the turn increases and lateral force of the vehicle increases. Thus, it is possible to make it more difficult for skid of the vehicle to occur, and so it is possible to inhibit, in advance, gentle deterioration in vehicle behavior such as slow spin. Accordingly, the possibility that a vehicle state has reached an unstable region can be detected earlier.

4 Claims, 3 Drawing Sheets

(56) References Cited

U.S. PATENT DOCUMENTS

| | | | |
|---|---|---|---|
| 5,938,296 A * | 8/1999 | Nakazawa | 303/113.2 |
| 6,431,663 B1 * | 8/2002 | Fennel et al. | 303/147 |
| 7,513,577 B2 | 4/2009 | Taniguchi et al. | |
| 2001/0021885 A1 | 9/2001 | Schulke et al. | |
| 2006/0055237 A1 | 3/2006 | Taniguchi et al. | |
| 2006/0273657 A1 * | 12/2006 | Wanke et al. | 303/146 |
| 2009/0187323 A1 * | 7/2009 | Schermann et al. | 701/72 |

FOREIGN PATENT DOCUMENTS

| | | | | |
|---|---|---|---|---|
| JP | 7-215190 A | | 8/1995 | |
| JP | 09109865 A | * | 4/1997 | B60T 8/58 |
| JP | 2004-114794 A | | 4/2004 | |
| JP | 2005-271817 A | | 10/2005 | |
| JP | 2005271817 A | * | 10/2005 | B60K 41/20 |
| JP | 2006-069346 A | | 3/2006 | |
| JP | 2009-202657 A | | 9/2009 | |
| WO | 2005/042321 A1 | | 5/2005 | |

OTHER PUBLICATIONS

Japanese Office Action (Notification of Reason of Rejection) dated Jun. 11, 2013, issued by the Japanese Patent Office in corresponding Japanese Patent Application No. 2009-217365, and English language translation of Office Action. (5 pages).

English language translation of the International Preliminary Report on Patentability (Form PCT/IB/373) and the Written Opinion of the International Searching Authority (Form PCT/ISA/237) issued on May 10, 2012, in the corresponding International Application No. PCT/JP2010/065484. (6 pages).

German Office Action issued Feb. 26, 2015, by the German Patent Office, in corresponding German Patent Application No. 112010003682.9 with English-language translation of German Office Action (10 pages).

* cited by examiner

VEHICLE BEHAVIOR CONTROL DEVICE

TECHNICAL FIELD

The present invention relates to a vehicle behavior control device that controls a spin tendency of a vehicle.

BACKGROUND ART

In related art, PTL 1 discloses a motion control system for a vehicle that aims to maintain vehicle stability by performing vehicle stability control based on detecting occurrence of a specific operation that induces a spin tendency of the vehicle, and then detecting a vehicle behavior change that results from the specific operation. For example, performance of an overmuch steer operation or load shifting operation by a driver may be detected as the specific operation, and as well as this, the divergence of a steering angle behavior and actual yaw rate behavior may be detected as the vehicle behavior change that results from this specific operation. The vehicle stability control is performed when these detections are made and when control start conditions for when there is a spin tendency are satisfied.

Furthermore, PTL 2 discloses a vehicle behavior control device that performs control of vehicle behavior, based on a stable region and an unstable region that reflect characteristics for a vehicle slip angle β and a slip angular velocity Δβ, such that a vehicle state changes from the unstable region to the stable region when a spin tendency is detected.

CITATION LIST

Patent Literature

[PTL 1]
Japanese Patent Application Publication No. JP-A-2006-69346
[PTL 2]
Japanese Patent Application Publication No. JP-A-Hei7-215190

SUMMARY OF INVENTION

Technical Problem

However, the art of PTL 1 has the problem that it takes time before the control starts because vehicle stability control is only performed after the specific operation and the vehicle behavior are detected. Furthermore, the art of PTL 2 similarly has the problem that it takes time before the control starts because, in control in which the vehicle state is changed to a stable state after first reaching an unstable state, control is performed only after an unstable state is finally reached.

In light of the foregoing, it is an object of the present invention to provide a vehicle behavior control device that can improve stability by starting control based on quicker detection of the possibility that a vehicle state will reach an unstable region.

Solution to Problem

In order to achieve the above-described object, an invention according to a first aspect includes a skid state determination means (140), a stable state determination means (140) and a transition region determination means (120) that determine, based on a state amount (β, Δβ) that is taken as an index of a skid state of a vehicle, whether a vehicle state is in an unstable region (R2), a stable region (R1) or a skid transition region (R3); and pre-skid control means (130) that performs a pre-skid control that applies brake force to a wheel at an outside of a turn when the transition region determination means (120) determines that the vehicle state is the skid transition region (R3).

In this manner, by determining that the vehicle state is in the skid transition region (R3), it is possible to detect the pre-skid state that is the state prior to when the vehicle reaches the unstable region (R2) where skid occurs, and generate the brake force in the wheel at the outside of the turn when the pre-skid state is detected. As a result of generating this brake force in the wheel at the outside of the turn, the load applied to the wheels at the outside of the turn increases and the lateral force of the vehicle increases. Thus, it is possible to make it more difficult for skid of the vehicle to occur, and as a result it is possible to inhibit, in advance, gentle deterioration in vehicle behavior such as slow spin. Accordingly, the possibility that the vehicle state has reached an unstable region can be detected earlier, thus making it possible to promote improved stability of the vehicle by starting the control.

For example, as described in a second aspect, state amount calculation means may calculate a slip angle (β) and a slip angular velocity (Δβ) of a vehicle body as the state amount, and the skid state determination means (140), the stable state determination means (140) and the transition region determination means (120) may determine, based on the slip angle (β) and the slip angular velocity (Δβ), whether the vehicle state is in the unstable region (R2), the stable region (R1) or the skid transition region (R3).

According to a third aspect, the pre-skid control means (130) applies brake force only to a rear wheel at the outside of the turn when it is determined that the vehicle state is in the skid transition region (R3).

In this manner, it is favorable if the brake force is applied only to the rear wheel at the outside of the turn as the control target wheel during pre-skid control. Specifically, even if the brake force is generated in the front wheel at the outside of the turn, a moment that leads to an understeer tendency of the vehicle is generated. However, if brake force is applied to the front wheel at the outside of the turn, which is mechanically connected to the steering, the brake force may sometimes lead the steering to move in a manner that is not intended. As a result, the driver may feel a sense of unease or a feeling that unnecessary operations are required due to having to perform correctional steering. Accordingly, by generating brake force in the rear wheel at the outside of the turn as in this embodiment, it is possible to inhibit the driver feeling a sense of unease or a feeling that unnecessary operations are necessary.

In addition, as described in a fourth aspect, the pre-skid control means (130) may apply brake force to a front wheel at the outside of the turn and a rear wheel at the outside of the turn when it is determined that the vehicle is in the unstable region (R2), and also brake force may be set based on the amount of a difference between an actual yaw rate detected by the yaw rate detection means and a target yaw rate obtained based on a steering angle detected by steering angle detection means and a vehicle body speed obtained by vehicle body speed obtaining means.

In this manner, even if the brake force is generated in both the front wheel and the rear wheel at the outside of the turn, the load applied to the wheels at the outside of the turn increases. Thus, it is possible to make it more difficult for skid of the vehicle to occur, and as a result it is possible to inhibit, in advance, gentle deterioration in vehicle behavior such as slow spin.

Note that, each of the reference signs in brackets for each of the above-described means are intended to show the relationship with the specific means described in the following embodiments.

DESCRIPTION OF EMBODIMENTS

Figure 1:
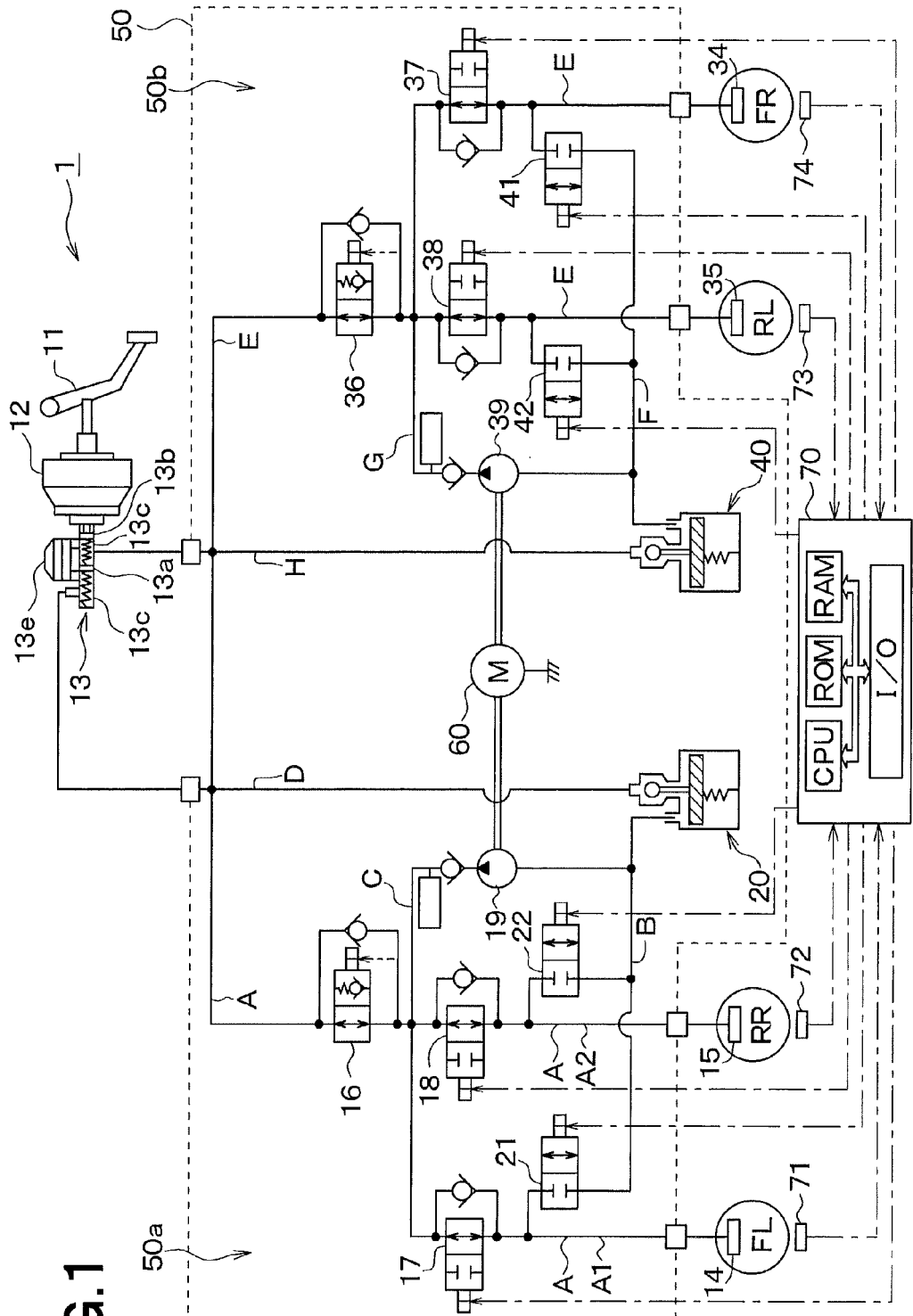
FIG. 1 shows the overall structure of a vehicular brake control system 1 that realizes a vehicle behavior control according to a first embodiment of the present invention.

Hereinafter, embodiments of the present invention will be explained based on the drawings. Note that portions that are the same or equivalent to each other in each of the embodiments that are hereinafter described are assigned the same reference signs in the drawings.

First Embodiment

A first embodiment of the present invention will be explained. FIG. 1 shows the overall structure of a vehicular brake control system 1 that realizes a vehicle behavior control according to the first embodiment of the present invention. In the present embodiment, an explanation will be given about when the brake control system 1 performs vehicle behavior control including an anti-spin control and an anti-skid control.

In FIG. 1, when a driver depresses a break pedal 11, a booster 12 multiplies a depression force and pushes master pistons 13a, 13b disposed in an M/C 13. As a result, the same M/C pressure is generated in a primary chamber 13c and a secondary chamber 13d that are compartmentalized by the master pistons 13a, 13b. The M/C pressure is transmitted to each W/C 14, 15, 34, 35 via a brake hydraulic pressure control actuator 50.

Note that, the M/C 13 includes a master reservoir 13e that has a passage that communicates respectively with the primary chamber 13c and the secondary chamber 13d.

The brake hydraulic pressure control actuator 50 includes a first conduit system 50a and a second conduit system 50b. The first conduit system 50a controls brake hydraulic pressure applied to a front left wheel FL and a rear right wheel RR and the second conduit system 50b controls brake hydraulic pressure applied to a front right wheel FR and a rear left wheel RL.

Since the first conduit system 50a and the second conduit system 50b have the same structure, the explanation below will focus on the first conduit system 50a and an explanation of the second conduit system 50b will be omitted.

The first conduit system 50a includes a conduit A that forms a main conduit that transmits the above described M/C pressure to the W/C 14 provided in the front left wheel FL and the W/C 15 provided in the rear right wheel RR to allow generation of W/C pressure.

In addition, the conduit A is provided with a first differential pressure control valve 16 that can control a communicating state and a pressure differential state. The valve position of the first differential pressure control valve 16 is adjusted such that, during normal braking (when vehicle behavior control is not being performed) when the driver performs an operation of the brake pedal 11, the first differential pressure control valve 16 is in a communicating state. A solenoid coil is provided in the first differential pressure control valve 16, and when a current is caused to flow therethrough, the valve position is adjusted such that a differential pressure becomes larger as a current value increases.

When the first differential pressure control valve 16 is in the differential pressure state, and only on occasions when the brake hydraulic pressure of the W/C 14, 15 side becomes higher by a predetermined value or more than the M/C pressure, flow of brake fluid only to the M/C 13 side from the W/C 14, 15 side is permitted. As a result, normally, pressure can be maintained such that the pressure on the W/C 14, 15 side does not become equal to or more than a determined pressure above the M/C 13 side.

Furthermore, the conduit A divides into two conduits A1, A2 on the W/C 14, 15 side that is downstream from the first differential pressure control valve 16. A first boost control valve 17 that controls the increase of brake hydraulic pressure to the W/C 14 is provided in the conduit A1, and a second boost control valve 18 that controls the increase of brake hydraulic pressure to the W/C 15 is provided in the conduit A2.

The first and second boost control valves 17, 18 are formed by two-position electromagnetic valves that can be controlled to be in an open or closed state.

The first and second boost control valves 17, 18 are normally-open valves that are operated to be in an open state when control current applied to a solenoid coil, which is provided in the first and second boost control valves 17, 18, is zero (when not-energized), and to be in a closed state when control current flows to the solenoid coil (when energized).

A conduit B, which acts as a pressure reducing conduit, connects at points between the first and second boost control valves 17, 18 and each W/C 14, 15 in the conduit A and a pressure adjusting reservoir 20. A first pressure reducing control valve 21 and a second pressure reducing control valve 22, which are formed from two-position electromagnetic valves that can be controlled to be in open and closed states, are respectively disposed in the conduit B. Note that, the first and second pressure reducing control valves 21, 22 are normally closed valves.

A conduit C, which acts as a recirculation conduit, is provided between the pressure adjusting reservoir 20 and the conduit A that is the main conduit. A self-suction pump 19 is provided in the conduit C and is driven by a motor 60 such that brake fluid is sucked-in/discharged from the pressure adjusting reservoir 20 to the M/C 13 side or the W/C 14, 15 side. The motor 60 is driven by controlling energization of a motor relay, not shown in the figures.

In addition, a conduit D, which acts as an auxiliary conduit, is provided between the pressure adjusting reservoir 20 and the M/C 13. During vehicle behavior control, the pump 19 discharges brake fluid sucked up from the M/C 13 to the conduit A via the conduit D in order to supply brake fluid to the W/C 14, 15 side and increase the W/C pressure of the wheel that is subject to control. Note that, the explanation given here focuses on the first conduit system 50a, but the structure of the second conduit system 50b is also the same, and the second conduit system 50b is provided with the same structural elements as the structural elements provided in the first conduit system 50a. More specifically, a second differential pressure control valve 36 corresponds to the first differential pressure control valve 16; third and fourth boost control valves 37, 38 correspond to the first and second boost control valves 17, 18; third and fourth pressure reducing control valves 41, 42 correspond to first and second pressure reducing control valves 21, 22; a pump 39 corresponds to the pump 19; a reservoir 40 corresponds to the reservoir 20; and conduits E-H correspond to the conduits A-D.

Figure 2:
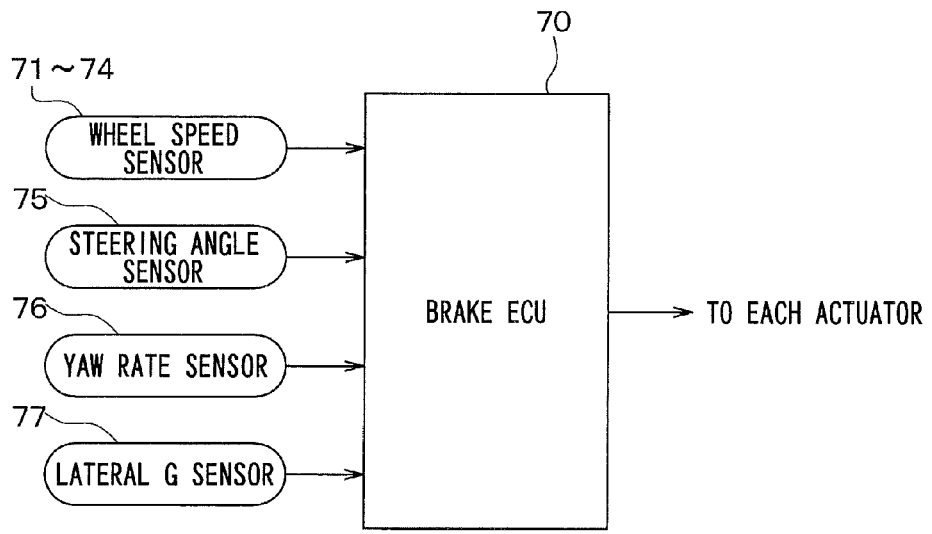
FIG. 2 is a block diagram showing an input/output relationship of a signal of a brake ECU 70.

Moreover, a brake ECU 70 corresponds to the vehicle behavior control device of the present invention that controls a control system of the brake control system 1, and is configured by a known micro-computer that includes a CPU, a ROM, a RAM, and I/O etc., and that performs processing such as various types of calculation in accordance with programs stored in the ROM etc. FIG. 2 is a block diagram showing an input/output relationship of a signal of the brake ECU 70.

As shown in FIG. 2, the brake ECU 70 receives detection signals from wheel speed sensors 71-74 provided in each wheel FL-RR, a steering angle sensor 75, a yaw rate sensor 76 and a lateral G (lateral acceleration) sensor 77, and performs the vehicle behavior control including calculation of various types of physical amount, anti-skid control etc.

Next, the vehicle behavior control performed by the brake ECU 70 provided in the brake control system 1 configured as described above will be explained in detail. Note that, the vehicle behavior controls that the brake ECU 70 is capable of performing includes traction control etc., but the explanation given here will only focus on vehicle behavior control including the anti-spin control and the anti-skid control that are key features of the present invention.

Figure 3:
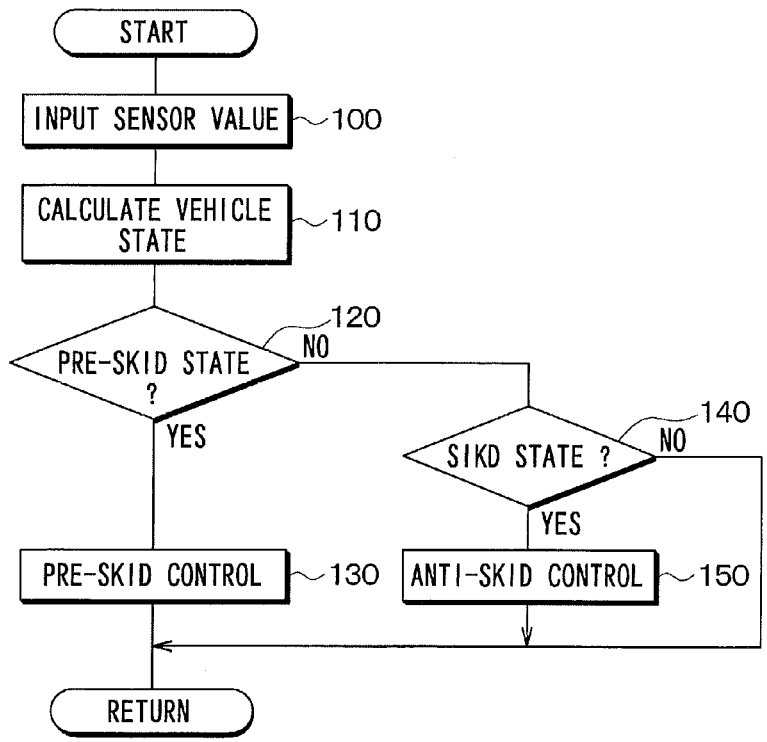
FIG. 3 is a flow chart showing details of the vehicle behavior control including an anti-spin control and an anti-skid control realized by the brake ECU 70.

FIG. 3 is a flow chart showing details of the vehicle behavior control including an anti-spin control and an anti-skid control realized by the brake ECU 70. The vehicle behavior control illustrated by this figure is performed at a determined control cycle when an ignition switch, not shown in the figures, is turned on, for example.

First, at step 100, the detection signals of each sensor 71-76 are input and each type of physical amount, namely, the wheel speeds of each wheel FL-RR, the steering angle, the yaw rate and the lateral G, is obtained. Then, at step 110, each type of vehicle state amount is calculated based on each type of physical amount obtained in step 100. Here, as the vehicle state amounts, vehicle state amounts that are taken as indexes representing a speed of the body of the vehicle (vehicle body speed) V, a vehicle skid state (spin behavior) etc. are calculated. Various possibilities could be conceived of for the state amounts that are taken as the index for the vehicle skid state (the spin behavior), but in the present embodiment a slip angle β of a vehicle body and a slip angular velocity Δβ that corresponds to a differential value thereof are calculated.

The vehicle body speed V is an estimated vehicle body speed derived based on a known method from vehicle wheel speeds of the four wheels, and is set as, for example, the highest vehicle wheel speed among the four wheels, or the average value of the wheel speeds of the three wheels among all four wheels that have the highest vehicle wheel speeds. Furthermore, the slip angle β of the vehicle body and the slip angular velocity Δβ are calculated in the manner described below.

More specifically, when the vehicle body speed is taken to be V, a radius of turn is taken to be R, and the slip angle β is simplified to be ≈0, the yaw rate Yr of steady-state circular turning can be expressed by the following expression.

$$Yr = V/R \quad \text{(Expression 1)}$$

Moreover, the slip angular velocity Δβ can be derived from Expression 2 below, and thus the slip angle β can be derived from Expression 3 as a differential value of the slip angular velocity Δβ. Note that the term Gy used in Expression 2 indicates lateral G.

$$\Delta\beta = Gy/V - Yr \quad \text{(Expression 2)}$$

$$\beta = \int \Delta\beta \, dt \quad \text{(Expression 3)}$$

Accordingly, as described above, because V, Yr, Gy, etc. have already been calculated based on the detection signals of each sensor 71-77, the slip angular velocity Δβ can be derived based on Expression 2, and this can be substituted in Expression 3 to derive the slip angle β.

Next, the processing advances to step 120 where it is determined whether or not there is a vehicle pre-skid state in which the vehicle can be expected to skid. The vehicle pre-skid state denotes a state in which a vehicle state is in a skid transition region R3 that extends from a stable region R1 to an unstable region R2. The stable region R1 is taken to be a region where the vehicle state is a stable state in which skid does not occur, and the unstable region R2 is taken to be a region where it can be expected that the vehicle has definitely reached a skid state. More specifically, the pre-skid state is the state prior to when it can definitely be expected that skid has started, and is a state immediately before skid starts or when a skid is occurring but it is small and is not significant enough to expect that a skid will definitely occur.

Figure 4:
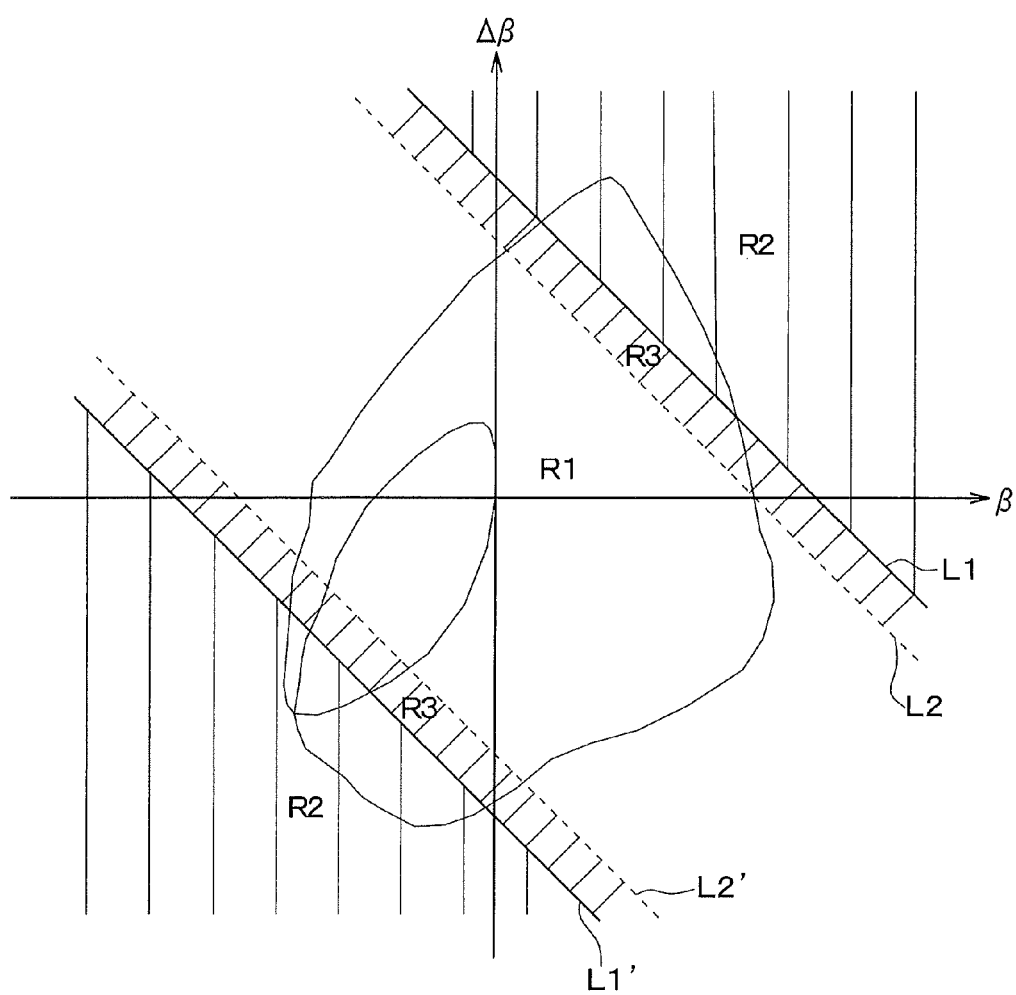
FIG. 4 is a map showing a relationship between the appearance of a change in a slip angle $\beta$ and a slip angular velocity $\Delta\beta$ and a stable region, an unstable region and a pre-skid state on a $\beta$-$\Delta\beta$ plane when a vehicle is turning.

FIG. 4 is a map showing a relationship between the appearance of a change in the slip angle β and the slip angular velocity Δβ and the stable region R1, the unstable region R2 and the skid transition region R3 on a β–Δβ plane when the vehicle is turning. As shown in the figure, when the slip angle β is taken as the x coordinate and the slip angular velocity Δβ is taken as the y coordinate, boundary lines L1, L1' between the unstable region R2 and the skid transition region R3 are expressed as a function expression of the slip angle β and the slip angular velocity Δβ. Furthermore, boundary lines L2, L2' between the skid transition region R3 and the stable region R1 are also expressed as a function expression of the slip angle β and the slip angular velocity Δβ. Therefore, based on whether the relationship of the calculated slip angle β and the slip angular velocity Δβ that is calculated at step 110 is between the boundary lines L1, L1' and the boundary lines L2, L2' that are expressed as such function expressions, it can be determined whether or not the vehicle state is in the skid transition region R3, namely, whether it is in the vehicle pre-skid state.

In this way, when it is determined that the vehicle is in the vehicle pre-skid state, the processing advances to step 130 where pre-skid control is performed as anti-spin control. More particularly, as the pre-skid control, brake force is applied to the rear wheel at the outside of the turn. The identification of the control target wheel, which is the rear wheel at the outside of the turn, is performed by obtaining a turn direction from the yaw rate and then selecting the rear wheel on the opposite side. With regard to the turn direction, because the sign of the yaw rate changes between positive and negative in accordance with the direction in which the vehicle is turning, it is possible to obtain the turn direction from this sign.

In addition, for example, if the right rear wheel RR is the control target wheel, in order to generate a desired brake force in the rear right wheel RR, a control signal that indicates that the W/C pressure is to be generated in the W/C 15 is output from the brake ECU 70. As a result, the motor 60 is driven to run the pump 19, whereby brake fluid is taken-in/discharged from the M/C 13. Then, by setting the first differential pressure control valve 16 to the pressure differential state at the same time, W/C pressure can be generated in the W/C 15. As a result of generating this brake force in the rear wheel to the outside of the turn, a load applied to the wheels at the outside of the turn is increased and thus a friction circle is increased, which in turn increases the lateral force of the vehicle. As a result, it is possible to make it more difficult for skid of the vehicle to occur, and thus it is possible to inhibit, in advance, gentle deterioration in vehicle behavior such as slow spin.

Note that, even if the brake force is generated in the front wheel at the outside of the turn, a moment that leads to an understeer tendency of the vehicle is generated. However, if brake force is applied to the front wheel at the outside of the turn, which is mechanically connected to the steering, the brake force may sometimes lead the steering to move in a manner that is not intended by the driver. As a result, the driver may feel a sense of unease or a feeling that unnecessary operations are required due to having to perform correctional steering. Accordingly, by generating brake force in the rear wheel at the outside of the turn as in this embodiment, it is possible to inhibit the driver feeling a sense of unease or a feeling that unnecessary operations are necessary.

Note that, in the case that the brake force is generated in the rear wheel at the outside of the turn, the moment that leads to the understeer tendency of the vehicle is generated until a slip rate reaches a determined value. However, when the slip rate exceeds the determined value, a moment that leads to an oversteer tendency of the vehicle is generated. Given this, it is possible to inhibit the spin tendency further by controlling the W/C pressure such that the slip rate does not exceed the determined value.

On the other hand, when a no determination is made at step 120, the processing advances to step 140, and it is determined whether or not there is a vehicle skid state. The determination is made based on whether or not the relationship between the slip angle β and the slip angular velocity Δβ calculated at step 110 is in the unstable region R2. More particularly, if the relationship between the slip angle β and the slip angular velocity Δβ is in the unstable region R2, the vehicle is in a skid state, and if the relationship is not in the unstable region R2, it is in the stable region R1 and thus the vehicle is not in the skid state.

Accordingly, when a yes determination is made at step 140, the processing advances to step 150, and if a no determination is made the processing ends as is. Further, normal anti-skid control is performed at step 150. The anti-skid control performed at this time can be performed using a generally known control, for example, the brake force may be generated in, for example, the front wheel or the rear wheel at the outside of the turn based on the amount of the difference between the actual yaw rate obtained from the detection signal from the yaw rate sensor 76, and a target yaw rate obtained from the vehicle body speed and the steering angle. As a result, when the vehicle is in an unstable state in which a skid is occurring, it is possible to inhibit the skid and then shift the vehicle into a stable state.

As explained above, in the present embodiment a pre-skid state is detected that is a state prior to when the vehicle reaches the unstable region R2 where it skids, and brake force is generated in the rear wheel at the outside of the turn when the pre-skid state is detected. As a result of generating this brake force in the rear wheel at the outside of the turn, the load applied to the wheels at the outside of the turn increases and the lateral force of the vehicle increases. Thus, it is possible to make it more difficult for skid of the vehicle to occur, and as a result it is possible to inhibit, in advance, gentle deterioration in vehicle behavior such as slow spin. Accordingly, the possibility that the vehicle state has reached an unstable state can be detected earlier, thus making it possible to promote even better stability of the vehicle by starting the control.

Furthermore, only the rear wheel at the outside of the turn is set as the control target wheel during pre-skid control and thus it is possible to inhibit, in advance, the steering moving in a non-intended way due to the brake force as occurs in the case that brake force is generated in the front wheel at the outside of the turn. Thus, it is possible to inhibit the driver feeling a sense of unease or a feeling that unnecessary operations are necessary.

Other Embodiments

In the above described embodiment, the slip angle β of the vehicle body and the slip angular velocity Δβ are used as the state amounts that are taken as the indexes representing the skid state (the spin behavior) of the vehicle, and these are used to make the determination about the vehicle pre-skid state and the vehicle skid state. However, this is merely one example, and as the state amounts that are taken as the indexes representing the skid state (the spin behavior) of the vehicle it is possible to use other state amounts such as a yaw rate difference between the target yaw rate and the actual yaw rate, for example.

In the case that the yaw rate difference is used as the state amount in this way, a configuration can be used in which, if an absolute value of the yaw rate difference exceeds a first threshold value that is a threshold value that indicates when the vehicle state is in the unstable region R2, it is determined that there is a vehicle skid state, and the anti-ski control is performed. Furthermore, a configuration can be used in which, if the absolute value of the yaw rate difference is equal or smaller than a second threshold value that is smaller than the first threshold value and that is a threshold value that indicates that the vehicle state is in the stable region R1, then it is determined that there is not a vehicle skid state, and thus anti-skid control is not performed. In addition, if the absolute value of the yaw rate difference is smaller than the first threshold value and larger than the second threshold value, the pre-skid control can be performed as the vehicle state is likely to be in the region R3 where it is skidding.

Moreover, in the above embodiment, an explanation was given about a case in which brake force was generated only at the rear wheel at the outside of the turn for the pre-skid control. However, if brake force is generated in one of or both the front wheel and rear wheel at the outside of the turn then, at the least, load applied to the rear wheels at the outside of the turn will increase. Accordingly, it is possible to make it more difficult for skid of the vehicle to occur, and thus it is possible to inhibit, in advance, gentle deterioration in vehicle behavior such as slow spin.

Note that, the steps shown in each of the figures correspond to means for performing each type of processing. For example, the portion that performs the processing of step 110 corresponds to state amount calculation means; the portion that performs step 120 corresponds to transition region determination means; the portion that performs step 130 corresponds to pre-skid control means; the portion that performs step 140 corresponds to unstable region determination means and stable region determination means; and the portion that performs step 150 corresponds to anti-skid control means.

REFERENCE SIGNS LIST

1 . . . Brake control system, 70 . . . Brake ECU, 71-74 . . . Vehicle wheel speed sensors, 75 . . . Steering angle sensor, 76 . . . Yaw rate sensor, 77 . . . Lateral G sensor

The invention claimed is:

1. A vehicle behavior control device comprising:
a state amount calculation means for calculating a state that is taken as an index of a skid state of a vehicle;
a skid state determination means for determining whether the vehicle is in an unstable state by comparing a vehicle state with an unstable region in which it is indicated that the vehicle in a skid state, the unstable region being pre-determined based on the state amount calculated by the state amount calculation means;
a stable state determination means for determining whether the vehicle is in a stable state by comparing the vehicle state with a stable region in which it is indicated that the vehicle is not in a skid state, the stable region being pre-determined based on the state amount calculated by the state amount calculation means;
a transition region determination means for determining whether the vehicle is in a pre-skid state by comparing the vehicle state with a pre-skid transition region which is located between the unstable region and the stable region and in which it is indicated the vehicle is in a pre-skid state in which it can be anticipated that the vehicle will skid at future time, the pre-skid transition region being pre-determined based on the state amount calculated by the state amount calculation means;
an anti-skid control means for performing anti-skid control by applying brake force to a front wheel at an outside of a turn and a rear at the outside of the turn when the skid state determination means determines that the vehicle state is in the unstable region; and
a pre-skid control means for performing a pre-skid control that applies brake force only to the rear wheel at the outside of the turn when the transition region determination means determines that the vehicle is in the skid transition region.

2. The vehicle behavior control device according to claim 1, wherein
the state amount calculation means calculates a slip angle and a slip angular velocity of a body of the vehicle as the state amount, and
the skid state determination means, the stable state determination means and the transition region determination means determine, based on the slip angle and the slip angular velocity, whether the vehicle state is in the unstable region, the stable region or the skid transition region.

3. The vehicle behavior control device according to claim 1 comprising:
a steering angle detection means for detecting a steering angle of the vehicle;
a vehicle body speed obtaining means for obtaining a speed of a body of the vehicle; and
a yaw rate detection means for detecting an actual yaw rate generated in the vehicle based on a detection signal of a yaw rate sensor, wherein
based on an amount of a difference, the pre-skid control means to be applied to the front wheel at the outside of the turn and the rear wheel at the outside of the turn when it is determined that the vehicle is in the unstable region, the difference being the difference between the actual yaw rate detected by the yaw rate detection means and a target yaw rate obtained based on the steering angle detected by the steering angle detection means and the speed of the body of the vehicle obtained by the vehicle body speed obtaining means.

4. The vehicle behavior control device according to claim 2, further comprising;
a steering angle detection means for detecting a steering angle of the vehicle;
a vehicle body speed obtaining means for obtaining a speed of a body of the vehicle; and
a yaw rate detection means for detecting an actual yaw rate generated in the vehicle based on a detection signal of a yaw rate sensor, wherein
based on an amount of a difference, the pre-skid control means sets the brake force to be applied to the front wheel at the outside of the turn and the rear wheel at the outside of the turn when it is determined that the vehicle is in the unstable region, the difference being the difference between the actual yaw rate detected by the yaw rate detection means and a target yaw rate obtained based on the steering angle detected by the steering angle detection means and the speed of the body of the vehicle obtained by the vehicle body speed obtaining means.

* * * * *